(12) United States Patent
Henry et al.

(10) Patent No.: US 11,743,463 B2
(45) Date of Patent: Aug. 29, 2023

(54) METHOD FOR ENCODING AND DECODING IMAGES ACCORDING TO DISTINCT ZONES, ENCODING AND DECODING DEVICE, AND CORRESPONDING COMPUTER PROGRAMS

(71) Applicant: ORANGE, Issy-les-Moulineaux (FR)

(72) Inventors: Felix Henry, Chatillon (FR); Joel Jung, Chatillon (FR); Bappaditya Ray, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 30 days.

(21) Appl. No.: 17/591,172

(22) Filed: Feb. 2, 2022

(65) Prior Publication Data
US 2022/0159256 A1 May 19, 2022

Related U.S. Application Data (63) Continuation of application No. 16/628,470, filed as application No. PCT/FR2018/051580 on Jun. 28, 2018, now Pat. No. 11,272,177.

(30) Foreign Application Priority Data
Jul. 5, 2017 (FR) ...................................... 1756316

(51) Int. Cl.
| | |
|---|---|
| *H04N 19/119* | (2014.01) |
| *H04N 19/105* | (2014.01) |
| *H04N 19/176* | (2014.01) |
| *H04N 19/46* | (2014.01) |

(52) U.S. Cl.
CPC ......... *H04N 19/119* (2014.11); *H04N 19/105* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | |
|---|---|---|
| 6,215,898 B1 | 4/2001 | Woodfill et al. |
| 2014/0028793 A1 | 1/2014 | Weigand |
| 2014/0092998 A1 | 4/2014 | Zhu et al. |

(Continued)

OTHER PUBLICATIONS

International Search Report dated Oct. 9, 2018, for corresponding International Application No. PCT/FR2018/051579, filed Jun. 28, 2018.

(Continued)

*Primary Examiner* — Edemio Navas, Jr.
(74) *Attorney, Agent, or Firm* — David D. Brush; Westman, Champlin & Koehler, P.A.

(57) ABSTRACT

A method and device for encoding an image divided into blocks. The image contains two separate zones. The method implements the following: only in the event where the current block pertains to one of the zones of the image: encoding the current block using a prediction, the current block being predicted using a previously encoded and then decoded block located in the other zone of the image, the blocks of the other zone having been previously encoded and then decoded, and encoding information indicating the application of the prediction; and for any decoded block pertaining to the other zone of the image, storing the decoded block data.

10 Claims, 5 Drawing Sheets

(56) References Cited

U.S. PATENT DOCUMENTS

| | | | |
|---|---|---|---|
| 2014/0098189 | A1 | 4/2014 | Deng et al. |
| 2014/0354771 | A1 | 12/2014 | Wang et al. |
| 2016/0234510 | A1 | 8/2016 | Lin et al. |
| 2016/0330471 | A1 | 11/2016 | Zhu et al. |
| 2016/0353117 | A1 | 12/2016 | Seregin et al. |
| 2017/0134743 | A1 | 5/2017 | Sim et al. |
| 2017/0310994 | A1 | 10/2017 | Seo et al. |
| 2018/0302645 | A1* | 10/2018 | Laroche .............. H04N 19/105 |
| 2021/0321096 | A1* | 10/2021 | Ahn .................... H04N 19/117 |

OTHER PUBLICATIONS

English translation of the International Written Opinion dated Oct. 22, 2018, for corresponding International Application No. PCT/FR2018/051579, filed Jun. 28, 2018.

International Search Report dated Oct. 9, 2018, for corresponding International Application No. PCT/FR2018/051580 filed Jun. 28, 2018.

English translation of the International Written Opinion dated Oct. 22, 2018, for corresponding International Application No. PCT/FR2018/051580, filed Jun. 28, 2018.

Notice of Allowance dated Nov. 23, 2021 for corresponding U.S. Appl. No. 16/628,467, filed Jan. 3, 2020.

Ralf Schafer et al., "The Emerging H.264/AVC Standard", Audio/Video Coding, EBU Technical Review—Jan. 2003.

Corrected Notice of Allowance dated Jun. 14, 2021 for corresponding U.S. Appl. No. 16/628,486, filed Jan. 3, 2020.

Notice of Allowance dated Apr. 27, 2021 for corresponding U.S. Appl. No. 16/628,486, filed Jan. 3, 2020.

Office Action dated Mar. 4, 2021 for corresponding U.S. Appl. No. 16/628,467, filed Jan. 3, 2020.

Final Office Action dated Dec. 14, 2020 for corresponding U.S. Appl. No. 16/628,486, filed Jan. 3, 2020.

Laroche G et al., "AHG10: On IBC memory reduction", Joint Collaborative Team on Video Coding (JCT-VC) of ITU-T SG 16 WP 3 and ISO/IEC JTC 1/SC 29/WG 11, 20th Meeting: Geveva, CH, 10-18, Document JCTVC-T0051, dated Feb. 9, 2015.

Final Office Action dated Nov. 2, 2020 for corresponding U.S. Appl. No. 16/628,467, filed Jan. 3, 2020.

International Search Report dated Jan. 8, 2019 for corresponding International Application No. PCT/FR2018/051581, filed Jun. 28, 2018.

Written Opinion of the International Searching Authority dated Jan. 8, 2019 for corresponding International Application No. PCT/FR2018/051581, filed Jun. 28, 2018.

English translation of the Written Opinion of the International Searching Authority dated Jan. 18, 2019 for corresponding International Application No. PCT/FR2018/051581, filed Jun. 28, 2018.

Shan Liu et al., "Overview of HEVC extensions on screen content coding", 11-15 APSIPA Transactions on Signal and Information Processing, vol. 4, Jan. 1, 2015 (Jan. 1, 2015), XP055454972.

Gary J. Sullivan et al., "Overview of the High Efficiency Video Coding (HEVC) Standard", IEEE Transactions on Circuits and Systems for Video Technology, vol. 22, No. 12, Dec. 2012.

Detlev Marpe, Heiko Schwarz, and Thomas Wiegand "Context-Based Adaptive Binary Arithmetic Coding in the H.264/AVC Video Compression Standard", IEEE Transactions on Circuits and Systems for Video Technology, vol. 13, No. 7, Jul. 2003.

Samelak Jaroslaw et al:., "Efficient frame-compatible stereoscopic video coding using HEVC screen content coding", 2017 International Conference On Systems, Signals and Image Processing (IWSSIP), IEEE, May 22, 2017 (May 22, 2017), pp. 1-5, XP033112648.

'Chen Y et al., ""AHG10: Motion related hooks for HEVC multiview/3DV extension based on long-term reference pictures"", 10. JCT-VC Meeting; 101. MPEG Meeting; Jul. 11, 2012-Jul. 20, 2012, Stockholm, (Joint Collaborative Team on Video Coding of ISO/IEC JTC1/SC29/WG11 and ITU-T SG.16 );URL: http://wftp3.itu.int/av-arch/jctvc-site/,, No. JCTVC-J0121. Jul. 3, 2012 (Jul. 3, 2012), XP030112483.

'Chen Y et al., ""Test Model 11 of 3D-HEVC and MV-HEVC"", 11. JCT-3V Meeting; Feb. 12, 2015-Feb. 18, 2015; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-K1003, May 1, 2015 (May 1, 2015), XP030132748.

Jaroslaw Samelak et al., "Experimental Results for Frame Compatible Multiview Video Coding Using HEVC SCC" 26. JCT-VC Meeting; Jan. 12, 2017-Jan. 20, 2017; Geneva; (Joint Collaborative Team on Video Coding of ISO/IEC JTC1/SC29/WG11 and ITU-T SG.16); URL: Http://wftp3.itu.int/av-arch/jctvc-site/,, No. JCTVC-Z0041, Jan. 13, 2017 (Jan. 13, 2017), XP030118149.

Li B. et al., "Non-SCCE1: Unification of intro BC and inter modes", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: Http://wftp3.itu.int/av-arch/jctvc-site/,, No. JCTVC-R0100-v2, Jun. 29, 2014 (Jun. 29, 2014), XP030116357.

Anonymous: "Study Text of ISO/IEC 14496-10:200X/FPDAM 1", 88. MPEG Meeting; Apr. 20, 2009-Apr. 24, 2009; Maui; (Motion Picture Expert Group or ISO/IEC JTC1/SC29/WG11),, No. N10540, Apr. 25, 2009 (Apr. 25, 2009), XP030017039.

Philipp Helle et al., "Block Merging for Quadtree-Based Partitioning in HEVC", IEEE Transaction on Circuits and Systems for Video Technology, Institut of Electrical and Electronics Engineers, USA, vol. 22, No. 12, Dec. 1, 2012 (Dec. 1, 2012), pp. 1720-1731, XP011487155.

ISO/IEC/23008-2 Recommendation ITU-T H.265 High Efficiency Video Coding (HEVC).

Office Action dated Jun. 15, 2020 for corresponding U.S. Appl. No. 16/628,467, filed Jan. 3, 2020.

Office Action dated Jun. 19, 2020 for corresponding U.S. Appl. No. 16/628,486, filed Jan. 3, 2020.

Office Action dated Jul. 13, 2020 for corresponding U.S. Appl. No. 16/628,470, filed Jan. 3, 2020.

Final Office Action dated Dec. 16, 2020 for corresponding U.S. Appl. No. 16/628,470, filed Jan. 3, 2020.

Office Action dated May 27, 2021 for corresponding U.S. Appl. No. 16/628,470, filed Jan. 3, 2020.

Notice of Allowance dated Oct. 25, 2021 for corresponding U.S. Appl. No. 16/628,470, filed Jan. 3, 2020.

Notice of Allowance dated Apr. 6, 2023 for corresponding U.S. Appl. No. 17/587,319, filed Jan. 28, 2022.

* cited by examiner

METHOD FOR ENCODING AND DECODING IMAGES ACCORDING TO DISTINCT ZONES, ENCODING AND DECODING DEVICE, AND CORRESPONDING COMPUTER PROGRAMS

CROSS-REFERENCE TO RELATED APPLICATIONS

This Application is a continuation of U.S. application Ser. No. 16/628,470, filed Jan. 3, 2020, which is a Section 371 National Stage Application of International Application No. PCT/FR2018/051580, filed Jun. 28, 2018, published as WO 2019/008254 A1 on Jan. 10, 2019, not in English, the contents of which are incorporated by reference in their entireties.

FIELD OF THE INVENTION

The present invention pertains generally to the field of image processing, and more precisely to the coding and to the decoding of parameters of digital images, whether these digital images are fixed or form part of a sequence of digital images.

The coding/decoding of such image parameters applies notably to images arising from at least one video sequence comprising:
- images arising from one and the same camera and following one another temporally (coding/decoding of 2D type),
- images arising from various cameras oriented according to different views (coding/decoding of 3D type),
- corresponding texture components and depth components (coding/decoding of 3D type),
- images obtained by projection of a 360° video,
- etc.

The present invention applies in a similar manner to the coding/decoding of parameters of images of 2D or 3D type.

The invention can notably, but not exclusively, apply to the video coding implemented in the current AVC (English abbreviation of "Advanced Video Coding") and HEVC (English abbreviation of "High Efficiency Video Coding") video coders and their extensions (MVC, 3D-AVC, MV-HEVC, 3D-HEVC, etc), and to the corresponding decoding.

BACKGROUND OF THE INVENTION

The current video coders (MPEG, H.264, HEVC, . . . ) use a block-wise representation of the video sequence. The images are split up into blocks, which might be split up again, for example in a recursive manner as in the HEVC standard.

For a current block to be coded, the image parameters associated with this block are coded in the form of bits with the aid of an adapted coding scheme implemented by a coder, such as for example an entropy coder whose aim is to code these parameters without loss.

Such parameters are for example:
- the residual prediction coefficients of the pixels of the current block,
- the mode of prediction of the current block (Intra prediction, Inter prediction, default prediction carrying out a prediction for which no information is transmitted to the decoder (in English "skip")),
- information specifying the type of prediction of the current block (orientation, reference image, . . . ),
- the type of splitting of the current block,
- the motion information of the current block if necessary,
- etc.

The bits obtained after entropy coding are written into a data signal which is intended to be transmitted to the decoder.

Once the coded-data signal has been received by the decoder, the decoding is done image by image, and for each image, block by block. For each block, the bits representative of the image parameters associated with the block are read, and then decoded with the aid of a decoding scheme implemented by a decoder.

For each image type or format considered, a specific coding is implemented. Thus for example, the AVC and HEVC coders/decoders are adapted to code/decode 2D images arising from one and the same camera and following one another temporally.

A coding of the aforementioned type generally uses, for a current image considered, a prediction of the current block. Various prediction modes exist, such as for example:
- the Intra prediction mode which consists in predicting the pixels of the current block with respect to pixels neighboring those of the current block, these neighboring pixels having already been coded and then decoded and possibly being situated in various predetermined directions, for example thirty-five in the HEVC standard,
- the Inter prediction mode which consists in predicting certain coding information associated with the current block, such as for example:
  - the temporal motion vector of the current block with respect to a temporal motion vector associated with a block of reference pixels,
  - the pixels of the current block with respect to the pixels of a block of reference pixels which is pointed at by the temporal motion vector and is situated in an image other than the current image to which the current block belongs.
- the "Intra Block Copy" (IBC) prediction mode, such as described in the document: SIP (2015), vol. 4, page 1 to 12, 2015, Industrial technology advances, "*Overview of HEVC extensions on screen content coding*" by Shan Liu, Xiaozhong Xu, Shawmin Lei and Kevin Jou, which makes it possible to predict the current block through a block belonging to the same image, in a previously coded and decoded part of the latter.

These prediction modes are set into competition and the prediction mode which optimizes a coding performance criterion, such as for example the bitrate-distortion criterion, is selected for the prediction of each block of the current image.

A drawback of the aforementioned predictive coding is that the availability of the IBC prediction mode both at the encoder and at the decoder increases the calculational resources. Moreover, at the encoder, it is necessary to code a syntax element specific to the IBC prediction mode and to write it into the signal to be transmitted to the decoder, thereby increasing the signaling cost. Finally, the IBC prediction mode involves the storage of all the image data at the encoder and at the decoder, so as to provide to be used for the coding and the decoding of the current block.

The invention is therefore aimed at a coder/decoder which proposes to apply at a current instant two different prediction modes to a current image arising from a video content of a given type or format, while making it possible to optimize:
- the coding/decoding performance for the current image,
- the complexity of the coding/decoding of the current image, the reduction in the memory resources at the encoder and at the decoder.

SUBJECT AND SUMMARY OF THE INVENTION

One of the aims of the invention is to remedy drawbacks of the aforementioned prior art.

To this effect, a subject of the present invention relates to a method for coding an image split up into blocks, said image containing two distinct zones.

Such a coding method is noteworthy in that it implements the following:
solely in the case where the current block belongs to one of the zones of the image:
code the current block with the aid of a prediction, the current block being predicted by using a previously coded and then decoded block situated in the other zone of the image, the blocks of the other zone having been previously coded and then decoded,
code an item of information which indicates the application of the prediction used,
for any decoded block which belongs to the other zone of the image, store the decoded-block data.

Such a provision makes it possible to reduce the complexity of the coding since a particular prediction mode is not used for the other zone of the image and will not therefore be set into competition with respect to other prediction modes during the coding of a block situated in the other zone.

Such a provision makes it possible furthermore to reduce the costs of storage of the coding data, since the data of the coded and then decoded blocks of the image are stored only for one of the two zones of the image.

According to a particular embodiment, the coding method comprises the coding of at least one item of location information in respect of the previously coded and then decoded block. Such an item of location information can be a motion vector or a set of coordinates.

Said item of location information thus coded is transmitted to the decoder, thereby allowing to it, during the decoding of a current block belonging to one of the zones of the current image, to locate the decoded block situated in the other zone of the current image.

According to a particular embodiment, the coding of an item of identification information in respect of each of the two zones of the image is implemented.

Such a provision makes it possible to transmit to the decoder the position of each of the zones with respect to one another.

Correlatively, the invention relates to a device for coding an image split up into blocks, said image containing two distinct zones, comprising a processing circuit which is designed to:
solely in the case where the current block belongs to one of the zones of the image:
code the current block with the aid of a prediction, the current block being predicted by using a previously coded and then decoded block situated in the other zone of the image, the blocks of the other zone having been previously coded and then decoded,
code an item of information which indicates the application of the prediction used,
for any decoded block which belongs to the other zone of the image, store the decoded-block data.

In a corresponding manner, the invention also relates to a method for decoding a data signal representative of an image split up into blocks which has been coded, said at least one image containing two distinct zones.

Such a decoding method is noteworthy in that it implements the following:
solely in the case where the current block belongs to one of the zones of the image:
read in the data signal an item of information which indicates the decoding of the current block with the aid of a prediction, the current block being intended to be predicted by using a previously decoded block, situated in the other zone of the image, the blocks of said other zone having been previously decoded,
decode the current block by using said prediction,
for any decoded block which belongs to the other of said zones of the image, store the decoded-block data.

According to a particular embodiment, the decoding method comprises the reading, in the data signal, of at least one item of location information in respect of the previously coded and then decoded block.

According to a particular embodiment, each of the zones of the image is identified by reading a corresponding item of identification information read in the data signal.

Correlatively, the invention relates to a device for decoding a data signal representative of an image split up into blocks which has been coded, said image containing two distinct zones, comprising a processing circuit which is designed to:
solely in the case where the current block belongs to one of the zones of the image:
read in the data signal an item of information which indicates the decoding of the current block with the aid of a prediction, the current block being intended to be predicted by using a previously decoded block, situated in the other zone of the image, the blocks of said other zone having been previously decoded,
decode the current block by using said prediction,
for any decoded block which belongs to the other of said zones of the image, store the decoded-block data.

The invention further relates to a computer program comprising instructions for implementing one of the coding and decoding methods according to the invention, when it is executed on a computer.

Such a program can use any programming language, and be in the form of source code, object code, or of code intermediate between source code and object code, such as in a partially compiled form, or in any other desirable form.

Yet another subject of the invention also envisages a recording medium readable by a computer, and comprising computer program instructions, such as mentioned hereinabove.

The recording medium can be any entity or device capable of storing the program. For example, the medium can comprise a storage means, such as a ROM, for example a CD ROM or a microelectronic circuit ROM, or else a magnetic recording means, a digital recording means, for example a USB key or a hard disk.

Moreover, such a recording medium can be a transmissible medium such as an electrical or optical signal, which can be conveyed via an electrical or optical cable, by radio or by other means. The program according to the invention can in particular be downloaded over a network of Internet type.

Alternatively, such a recording medium can be an integrated circuit in which the program is incorporated, the circuit being adapted to execute the method in question or to be used in the execution of the latter.

BRIEF DESCRIPTION OF THE DRAWINGS

Other characteristics and advantages will become apparent on reading preferred embodiments described with reference to the figures in which.

DETAILED DESCRIPTION OF ILLUSTRATIVE EMBODIMENTS

Detailed Description of the Coding Part

An embodiment of the invention will now be described, in which the coding method according to the invention is used to code an image or a sequence of images according to a binary stream close to that obtained by a coding implemented in a coder complying with any one of the current or forthcoming video coding standards.

In this embodiment, the coding method according to the invention is for example implemented in a software or hardware manner by modifications of such a coder. The coding method according to the first embodiment of the invention is represented in the form of an algorithm comprising operations C1 to C100a) or C1 to C101b) such as are represented in FIG. 1.

Figure 2:
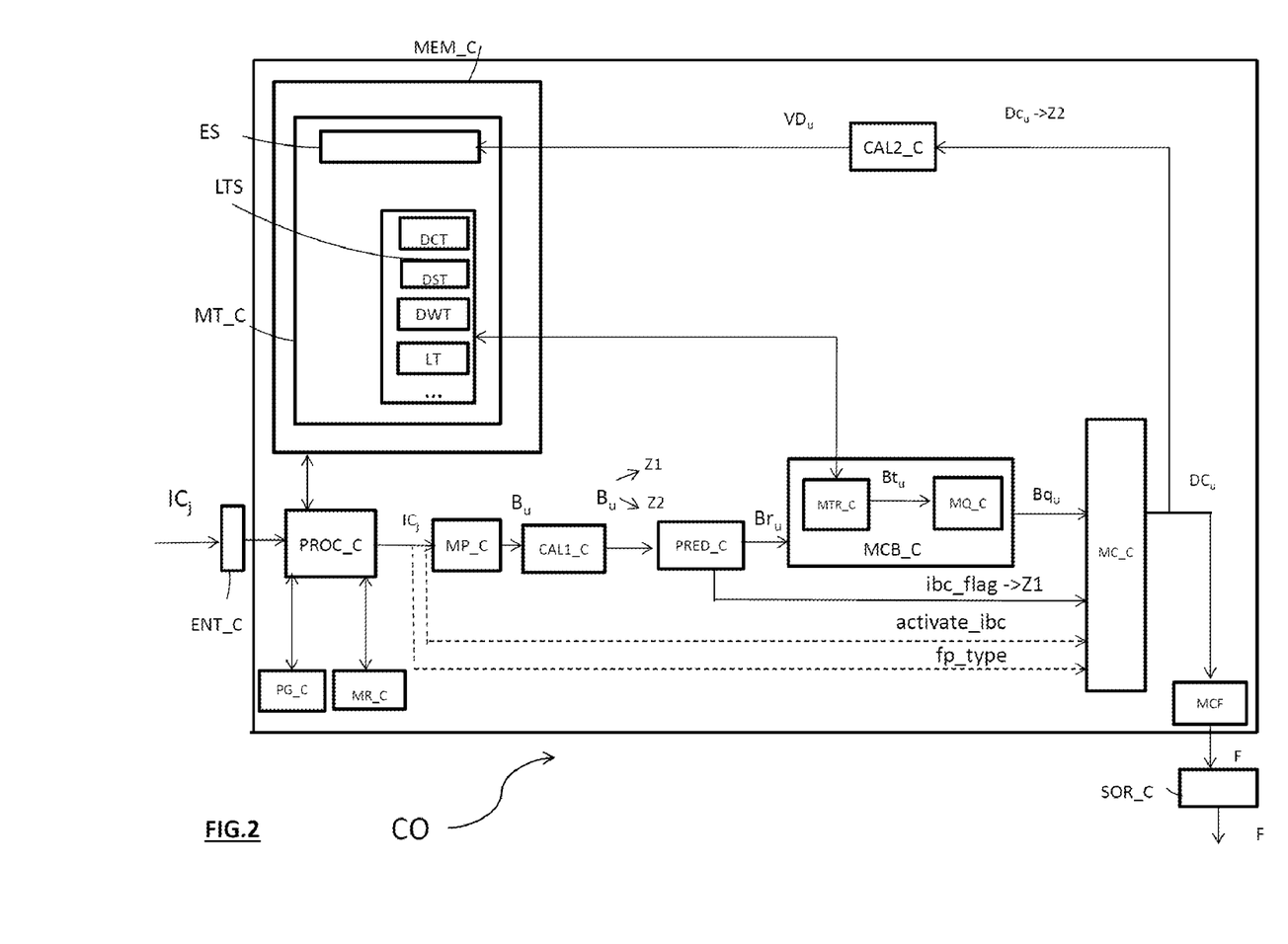
FIG. 2 represents a coding device according to an embodiment of the invention, FIGS. 3A to 3C each represent examples of distinct zones in the current image.

According to the embodiment of the invention, the coding method according to the invention is implemented in a coding device or coder CO represented in FIG. 2.

As illustrated in FIG. 2, the coder CO comprises a memory MEM_C comprising a buffer memory MT_C, a processor PROC_C driven by a computer program PG_C which implements the coding method according to the invention. On initialization, the code instructions of the computer program PG_C are for example loaded into a RAM memory, denoted MR_C, before being executed by the processor PROC_C.

Figure 1:
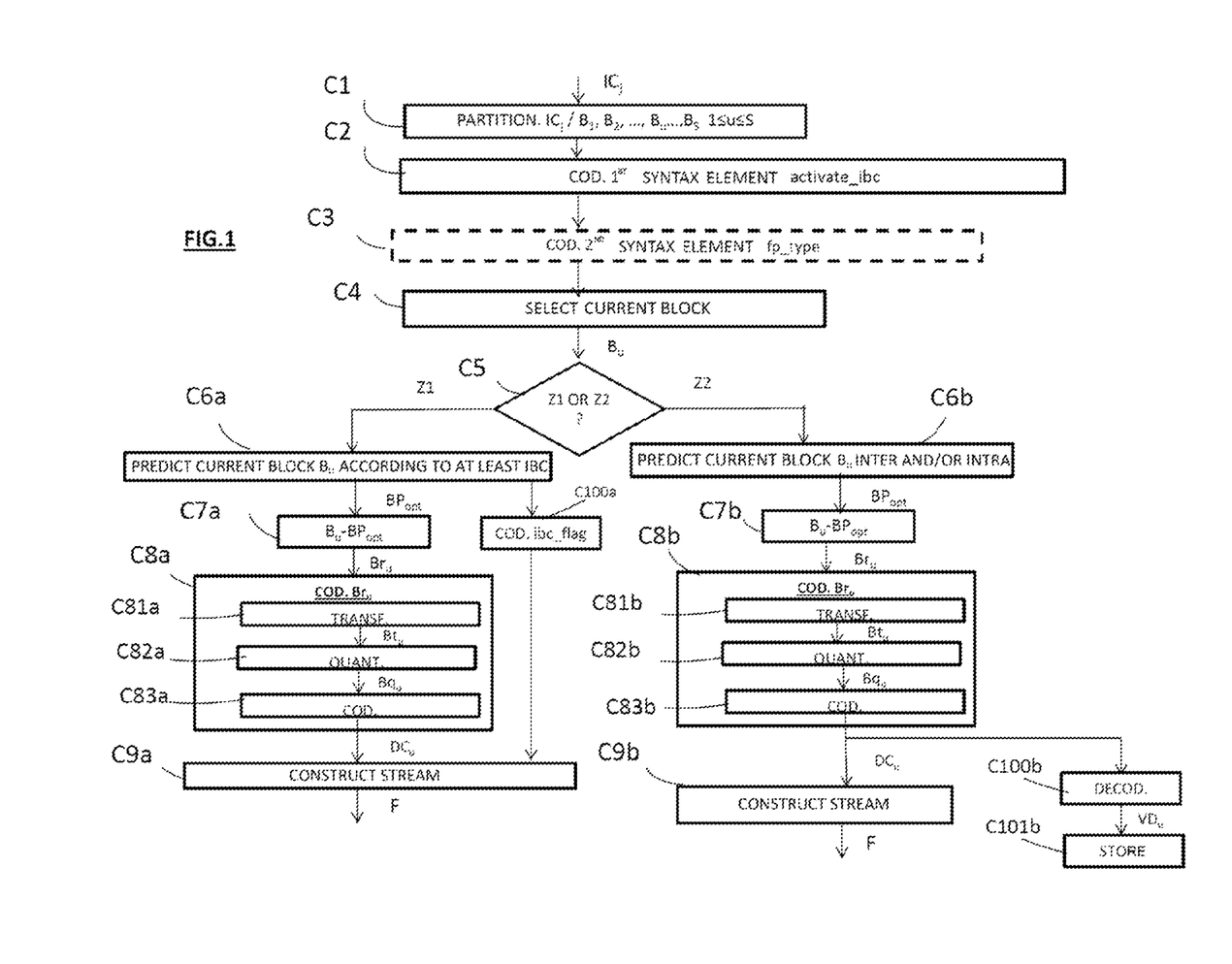
FIG. 1 represents the progress of the coding method according to a first embodiment of the invention.

The coding method represented in FIG. 1 applies to any current image $IC_j$ which is fixed or else which forms part of a sequence of L images $IC_1, \ldots, IC_j, \ldots, IC_L$ ($1 \leq j \leq L$) to be coded.

The current image $IC_j$ arises from at least one video sequence comprising, by way of non-exhaustive examples:
 images arising from one and the same camera and following one another temporally (coding/decoding of 2D type),
 images arising from various cameras oriented according to different views (coding/decoding of 3D type),
 corresponding texture components and depth components, that is to say which are representative of one and the same scene (coding/decoding of 3D type),
 images obtained by projection of a 360° video,
 images obtained by projection of a stereo video and each comprising two views representative of one and same scene, which are intended to be looked at by the left eye and the right eye of the user, respectively,
 non-natural images of the "screen Content" type, such as for example images obtained by screen video capture, etc.

With reference to FIG. 1, there is undertaken at C1, in a manner known per se, the splitting of a current image $IC_j$ into a plurality of blocks $B_1, B_2, \ldots, B_u, \ldots, B_S$ ($1 \leq u \leq S$). The partitioning is implemented by a partitioning device MP_C represented in FIG. 2, which device is driven by the processor PROC_C.

It should be noted that within the meaning of the invention, the term "block" signifies coding unit. The latter terminology is used notably in the HEVC standard "ISO/IEC/23008-2 Recommendation ITU-T H.265 High Efficiency Video Coding (HEVC)".

In particular, such a coding unit groups together sets of pixels of rectangular or square shape, also called blocks, macroblocks, or else sets of pixels exhibiting other geometric shapes.

Said blocks $B_1, B_2, \ldots, B_u, \ldots, B_S$ are intended to be coded according to a predetermined order of traversal, which is for example of the lexicographic type. This signifies that the blocks are coded one after the other, from left to right.

Other types of traversal are of course possible. Thus, it is possible to split the image $IC_j$ into several sub-images called slices and to apply a splitting of this type independently to each sub-image. It is also possible to code not a succession of lines, as explained hereinabove, but a succession of columns. It is also possible to traverse the lines or columns in either direction.

According to an example, the blocks $B_1, B_2, \ldots, B_u, \ldots, B_S$ have a square shape and all contain K pixels, with $K \geq 1$. By way of non-exhaustive example, the blocks have a size of 64×64 pixels and/or 32×32 and/or 16×16 and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

At C2, there is undertaken the coding of a first syntax element activate_ibc which is associated with a characteristic of the current image $IC_j$.

The syntax element activate_ibc is a high-level syntax element of a video sequence comprising the current image $IC_j$. To this effect, as a function of the coding context, this element can be coded:
 at the start of the coding of each image of the video sequence,
 or just once at the start of the coding of a sequence of images,
 or just once at the start of the coding of the video sequence.

The syntax element activate_ibc is intended to indicate whether, for the current block to be coded, a prediction mode of the "Intra Block Copy" type mentioned above in the description, according to which the current block, situated in a first zone of the current image, is predicted with respect to a previously coded and then decoded block situated in a second zone of the current image, the blocks of the second zone having been previously coded and then decoded, is set into competition with other predetermined prediction modes. According to the invention, the first and second zones are distinct, in the sense that they do not overlap.

The coding C2 is for example an entropy coding of CABAC ("Context Adaptive Binary Arithmetic Coder") type or else an entropy coding of arithmetic or Huffman type. This coding is implemented by a coding device MC_C represented in FIG. 2, which device is driven by the processor PROC_C.

According to a preferred embodiment, the syntax element activate_ibc takes the value 0 if the prediction mode of the "Intra Block Copy" type is not set into competition and the value 1 if the prediction mode of the "Intra Block Copy" type is set into competition.

Figure 3A:
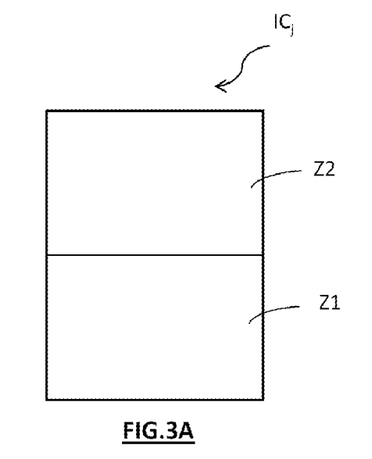

According to a first embodiment represented in FIG. 3A, a current image $IC_j$ comprises a first zone Z1 which extends over the bottom half of the image and a second zone Z2 which extends over the top half of the image.

Figure 3B:
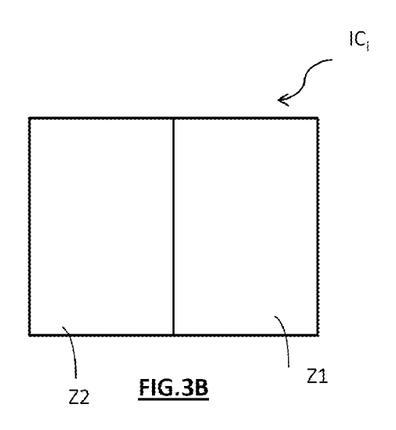

According to a second embodiment represented in FIG. 3B, a current image $IC_j$ comprises a first zone Z1 which extends over the right half of the image and a second zone Z2 which extends over the left half of the image.

Figure 3C:
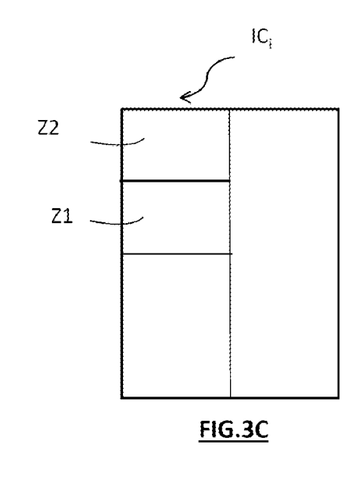

According to a third embodiment represented in FIG. 3C, a current image $IC_j$ comprises a first zone Z1 which extends over the bottom left quarter of the image and a second zone Z2 which extends over the top left quarter of the image.

Other configurations are of course possible. For example, the zones Z1 and Z2 may be swapped. Furthermore the zones Z1 and Z2 may or may not have the same shape.

Optionally, as represented dashed in FIG. 1, there is undertaken, at C3, the coding of a second syntax element fp_type which is associated with another characteristic of the current image $IC_j$.

The syntax element fp_type is also a high-level syntax element of a video sequence comprising the current image $IC_j$. To this effect, as a function of the coding context, this element can be coded:
  at the start of the coding of each image of the video sequence,
  or just once at the start of the coding of a sequence of images,
  or just once at the start of the coding of the video sequence.

The syntax element fp_type is intended to indicate if the current image is composed of several views captured at the same temporal instant and arranged in the current image so as to form a single view (rectangle of pixels). A method for composing such an image uses for example the technique called "Frame Packing" (FP).

The coding C3 is for example an entropy coding of CABAC type or else an entropy coding of arithmetic or Huffman type. This coding is implemented by the coding device MC_C of FIG. 2.

According to a preferred embodiment, the syntax element fp_type takes for example:
  the value 01 to indicate that the zones Z1 and Z2 are arranged as represented in FIG. 3A,
  the value 10 to indicate that the zones Z1 and Z2 are arranged as represented in FIG. 3B,
  the value 11 to indicate that the zones Z1 and Z2 are arranged as represented in FIG. 3C.

With reference to FIG. 1, the coder CO of FIG. 2 selects at C4 a current block to be coded $B_u$ of the image $IC_j$.

At C5, there is undertaken the location of the current block $B_u$ of the image $IC_j$ for example by determining its coordinates with respect to the first pixel situated at the top left of the image $IC_j$, and which has coordinates (0,0).

The location C5 is implemented by a calculation device CAL1_C such as represented in FIG. 2, which device is driven by the processor PROC_C.

If the current block $B_u$ belongs to the first zone Z1 of the image $IC_j$ and if the first syntax element activate_ibc has the value 1, there is undertaken at C6a) the prediction of the current block $B_u$ by the prediction technique of the "Intra Block Copy" type, as well as by conventional, for example Intra and/or Inter, prediction techniques. To this effect, the block $B_u$ is predicted with respect to at least one predictor block in accordance with a mode of prediction belonging to one of the prediction techniques which have just been mentioned. In the course of the prediction C6a), at least one item of location information in respect of the predictor block is determined. Such an item of information is for example, a motion vector which points at the predictor block, the coordinates of the first pixel at the top left of the predictor block, etc . . . .

In a manner known per se, the current block $B_u$ is predicted with respect to a plurality of candidate predictor blocks. Each of the candidate predictor blocks is a block of pixels which has been already coded and then decoded.

Thus, in the case of the intra prediction technique, the current block $B_u$ is predicted by interpolation on the basis of values of decoded pixels of candidate predictor blocks which are situated immediately to the left of or above the current block.

In the case of the inter prediction technique, the current block $B_u$ is predicted by interpolation on the basis of values of decoded pixels of candidate predictor blocks which are situated in one or more previously processed and stored images.

In accordance with the invention, in the case of the "Intra Block Copy" prediction technique, the current block $B_u$ is predicted by interpolation on the basis of values of decoded pixels of candidate predictor blocks which are situated in the second zone Z2 of the current image $IC_j$.

On completion of the prediction step C6a), an optimal predictor block $BP_{opt}$ is obtained subsequent to a setting into competition of said predetermined prediction techniques, according to a predetermined coding performance criterion, for example by minimizing a distortion bitrate criterion well known to the person skilled in the art. The block $BP_{opt}$ is considered to be an approximation of the current block $B_u$. The information relating to this prediction is intended to be written, in the form of syntax elements, into a data signal or stream to be transmitted to a decoder.

In accordance with the invention:
  in the case where the block $BP_{opt}$ has been obtained by "Intra Block Copy" prediction, there is undertaken at C100a) the coding of a syntax element ibc_flag by the coding device MC_C of FIG. 2. The syntax element ibc_flag is for example coded to the value 1. Other syntax elements indicate the location of the predictor block $BP_{opt}$ stored in the second zone Z2 of the current image $IC_j$: it entails for example a motion vector which points at the predictor block $BP_{opt}$, the coordinates of the first pixel at the top left of the predictor block $BP_{opt}$, etc . . . ;
  in the case where the block $BP_{opt}$ has not been obtained by "Intra Block Copy" prediction, the syntax element ibc_flag is moreover coded to the value 0.

There is thereafter undertaken at C7a) the comparison of the data relating to the current block $B_u$ with the data of the predictor block $BP_{opt}$. Such a comparison consists in calculating the difference between the predictor block obtained $BP_{opt}$ and the current block $B_u$.

A data set, called residual block $Br_u$, is then obtained.

The operations C6a) and C7a) are implemented by a predictive coding device PRED_C represented in FIG. 2, which device is driven by the processor PROC_C.

With reference again to FIG. 1, the data of the current residual block $Br_u$ are coded at C8a).

According to a nonlimiting exemplary embodiment, such a coding C8a) implements the application C81a) of a transform to the pixels of the current residual block $Br_u$.

In a manner known per se, as a function of the context or of the coding standard used, such a transform is for example a transform of DCT (English abbreviation of "Discrete Cosine Transform"), DST (English abbreviation of "Discrete Sine Transform") type, of DWT (English abbreviation of "Discrete Wavelet Transform") type or else of LT (English abbreviation of "Lapped Transform") type. These transforms are stored previously in a list LTS, in the buffer memory MT_C of the coder CO of FIG. 2.

On completion of the application of this transform, a current transformed data block $Bt_u$ is obtained.

Such an operation is performed by a transform calculation device MTR_C, such as represented in FIG. 2, which device is driven by the processor PROC_C.

The coding C8a) furthermore implements a quantization C82a) of the data of the transformed block $Bt_u$ according to a conventional quantization operation, such as for example a scalar or vector quantization. A block $Bq_u$ of quantized coefficients is then obtained.

The quantization C82a) is implemented by a quantization device MQ_C such as represented in FIG. 2, which device is driven by the processor PROC_C.

The transform calculation device MTR_C and the quantization device MQ_C are contained in a device for coding blocks MCB_C which is represented in FIG. 2, which device is driven by the processor PROC_C.

The coding C8a) furthermore implements a coding C83a) of the data of the block $Bq_u$ of quantized coefficients. The coding C83a) is implemented by the coding device MC_C of FIG. 2. A set of coded data $DC_u$ of the current block $B_u$ is obtained on completion of the coding C83a).

With reference to FIG. 1, there is undertaken at C9a) the construction of a portion of a data signal F, said portion containing in particular according to the invention:
  the coded data $DC_u$ obtained at C8a),
  the value 0/1 of the syntax element ibc_flag,
  optionally the value 0/1 of the first syntax element activate_ibc, if the latter is coded at the image level,
  optionally the value 0/1 of the second syntax element fp_type, if the latter is coded at the image level.

The construction of the signal portion F is implemented by a data signal construction device MCF, such as represented in FIG. 2.

If on completion of the location C5, the current block $B_u$ belongs to the second zone Z2 of the image $IC_j$ and if the first syntax element activate_ibc has the value 1, there is undertaken at C6b) the prediction of the current block $B_u$ by conventional, such as for example Intra and/or Inter, prediction techniques. To this effect, the block $B_u$ is predicted with respect to at least one predictor block in accordance with a prediction mode belonging to one of the conventional prediction techniques which have just been mentioned.

On completion of prediction step C6b), an optimal predictor block $BP_{opt}$ is obtained subsequent to a setting into competition of said predetermined conventional prediction techniques, according to a predetermined coding performance criterion, for example by minimization of the distortion bitrate criterion. The block $BP_{opt}$ is considered to be an approximation of the current block $B_u$. The information relating to this prediction is intended to be written, in the form of syntax elements, into a data signal or stream to be transmitted to a decoder.

At C7b) a calculation of the difference between the predictor block obtained $BP_{opt}$ and the current block $B_u$ is implemented conventionally.

A data set, called residual block $Br_u$, is then obtained.

A coding C8b) of the residual block $Br_u$ is implemented and comprises operations C81b), C82b) and C83b) which are respectively identical to the aforementioned operations C81a), C82a) and C83a) and which for this reason, are not described again here.

On completion of the coding C83b), a set of coded data $DC_u$ of the current block $B_u$ is obtained.

With reference to FIG. 1, there is undertaken at C9b) the construction of a portion of the data signal F, said portion containing the coded data $DC_u$ obtained at C8b) and information relating to the prediction of the current block used. It should be noted that the portion of the signal F does not contain the value 0 or 1 of the syntax element ibc_flag, the "Intra Block Copy" prediction not having been set into competition during the coding of the current block of the second zone Z2. The stream F contains:
  optionally the value 0/1 of the first syntax element activate_ibc, if the latter is coded at the image level,
  optionally the value 0/1 of the second syntax element fp_type, if the latter is coded at the image level In accordance with the invention, if first syntax element activate_ibc has the value 1, there is undertaken at C100b) the calculation of a decoded version $BD_u$ of the current block $B_u$ on the basis of the coded data set $DC_u$ obtained on completion of the coding C8b). Such a decoded version corresponds to the decoded block obtained on completion of the method, which will be described further on in the description, for decoding the image $IC_j$.

The calculation C100b) is implemented by a calculation device CAL2_C such as represented in FIG. 2, which device is driven by the processor PROC_C.

The decoded version $BD_u$ of the current block $B_u$ is stored at C101b) in a space ES of the buffer memory MT_C of the coder CO of FIG. 2 so as to be used by the coder CO to predict the following blocks of the current image $IC_j$ or of another image.

The calculation C100b) and the storage C101b) are implemented either before the construction C9b) of the signal portion F, or after.

In a manner known per se, irrespective of the construction C9a) or C9b) of signal portion F implemented, the signal portion F can furthermore comprise certain information encoded by the coder CO, such as for example:
  the Inter and/or Intra prediction type if the current block $Bu$ has been inter- and/or intra-predicted, and if relevant, the prediction mode selected, the index of the predictor block obtained,
  the type of partitioning of the current block $B_u$ if the latter has been partitioned,
  the type of transform applied to the data of the current block $B_u$,
  etc . . . .

The data signal F is thereafter transmitted by a communication network (not represented) to a remote terminal. The latter comprises the decoder DO represented in FIG. 7.

The coding operations C1 to C100a) or else C1 to C101b) which have just been described hereinabove are thereafter implemented for each of the blocks $B_1, B_2, \ldots, B_u, \ldots, B_S$ to be coded of the current image $IC_j$ considered, in a differentiated manner depending on whether the current block is situated in the first zone Z1 or the second zone Z2 of the current image $IC_j$.

Detailed Description of the Decoding Part

An embodiment of the invention will now be described, in which the decoding method according to the invention is used to decode a data signal or stream representative of an image or of a sequence of images which is able to be decoded by a decoder complying with any one of the current or forthcoming video decoding standards.

In this embodiment, the decoding method according to the invention is for example implemented in a software or hardware manner by modifications of such a decoder.

Figure 4:
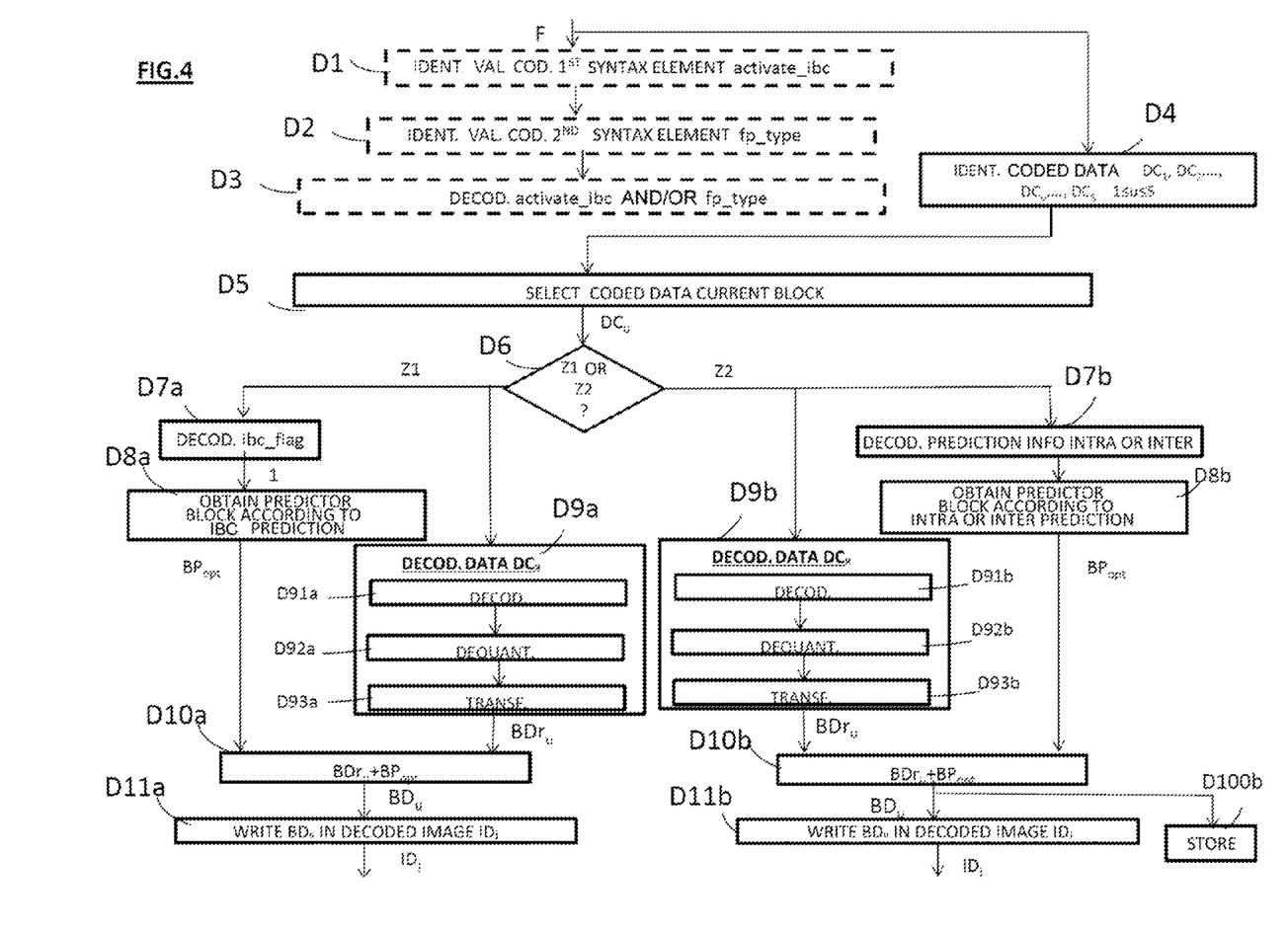
FIG. 4 represents the progress of the decoding method according to an embodiment of the invention.

The decoding method according to the invention is represented in the form of an algorithm comprising operations D1 to D11a) or D1 to D100b) such as represented in FIG. 4.

Figure 5:
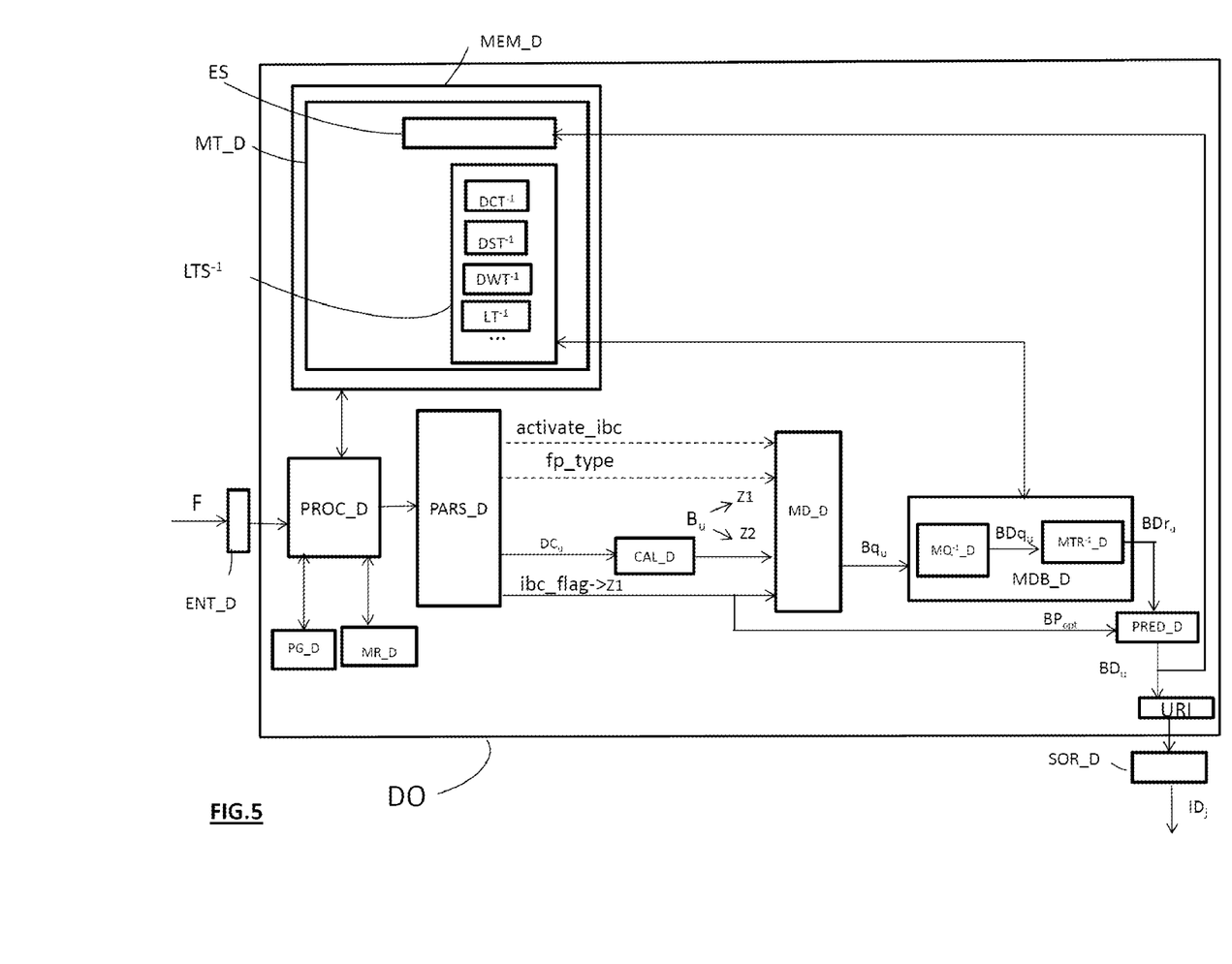
FIG. 5 represents a decoding device according to an embodiment of the invention.

According to this embodiment, the decoding method according to the invention is implemented in a decoding device or decoder DO represented in FIG. 5.

As illustrated in FIG. 5, according to this embodiment of the invention, the decoder DO comprises a memory MEM_D which itself comprises a buffer memory MT_D, a processor PROC_D driven by a computer program PG_D which implements the decoding method according to the invention. On initialization, the code instructions of the computer program PG_D are for example loaded into a RAM memory denoted RAM_D, before being executed by the processor PROC_D.

The decoding method represented in FIG. 4 applies to any coded current image $IC_j$ which is fixed or else which forms part of a sequence of L images $IC_1, \ldots, IC_j, \ldots, IC_L$ ($1 \leq j \leq L$) to be decoded.

The current image $IC_j$ to be decoded arises from at least one video sequence comprising, by way of non-exhaustive examples:
- images arising from one and the same camera and following one another temporally (coding/decoding of 2D type),
- images arising from various cameras oriented according to different views (coding/decoding of 3D type),
- corresponding texture components and depth components, that is to say which are representative of one and the same scene (coding/decoding of 3D type),
- images obtained by projection of a 360° video,
- images obtained by projection of a stereo video and each comprising two views representative of one and the same scene, which are intended to be looked at respectively through the left eye and the right eye of the user,
- non-natural images of the "screen Content" type, such as for example the images obtained by screen video capture,
- etc. . . . .

At D1, there is undertaken the reading, in the data signal F, of the coded value 0 or 1 of the first syntax element activate_ibc which is associated with a characteristic of the current image $IC_j$ to be decoded, in the case where this syntax element has been coded at the level of the current image $IC_j$. As the identification D1 is optional, it is represented dashed in FIG. 4.

At D2, there is undertaken the reading, in the data signal F, of the coded value 0 or 1 of the second syntax element fp_type which is associated with a characteristic of the current image $IC_j$ to be decoded, in the case where this syntax element has been coded at the level of the current image $IC_j$. As the identification D2 is optional, it is represented dashed in FIG. 4.

According to a preferred embodiment, the syntax element fp_type which is read takes for example:
- the value 01 to indicate that the zones Z1 and Z2 are arranged as represented in FIG. 3A,
- the value 10 to indicate that the zones Z1 and Z2 are arranged as represented in FIG. 3B,
- the value 11 to indicate that the zones Z1 and Z2 are arranged as represented in FIG. 3C.

The identifications D1 and D2 are implemented by a stream analysis device PARS_D, such as represented in FIG. 5, said device being driven by the processor PROC_D.

In case of identification, at D3, the coded value 0 or 1 taken by the first syntax element activate_ibc and/or one of the values 01, 10, 11 taken by the second syntax element fp_type are decoded.

Such a decoding D3 is implemented by a decoding device MD_D represented in FIG. 5, which device is driven by the processor PROC_D.

The decoding is for example an entropy decoding of CABAC type or else an entropy decoding of arithmetic or Huffman type.

With reference to FIG. 4, there is undertaken at D4 the identification, in the signal F, of the coded data $DC_1$, $DC_2, \ldots, DC_u, \ldots, DC_S$ ($1 \leq u \leq S$) associated respectively with the blocks $B_1, B_2, \ldots, B_u, \ldots, B_S$ coded previously in accordance with the aforementioned lexicographic order, which have been obtained on completion of the coding operation C8a) or C8b) of FIG. 1. This signifies that the blocks are decoded one after another, from left to right, in a corresponding manner to the order of coding mentioned above.

Such an identification D4 is implemented by the stream analysis device PARS_D of FIG. 4.

Other types of traversal than that which has just been described hereinabove are of course possible and depend on the order of traversal chosen on coding.

According to an example, the blocks $B_1, B_2, \ldots, B_u, \ldots, B_S$ have a square shape and all contain K pixels, with $K \geq 1$. By way of non-exhaustive example, the blocks have a size of 64×64 pixels and/or 32×32 and/or 16×16 and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

With reference to FIG. 4, at D5, the decoder DO of FIG. 5 selects as current block to be decoded a current set of coded data $DC_u$ of the image $IC_j$, which set is associated with a block $B_u$ to be decoded.

At D6, there is undertaken the location of the current block $B_u$ to be decoded of the image $IC_j$, for example by determining its coordinates with respect to the first reconstructed pixel of the image $IC_j$, which pixel is situated at the top left of the latter and has coordinates (0,0).

The location D6 is implemented by a calculation device CAL_D such as represented in FIG. 5, which device is driven by the processor PROC_D.

If the current block $B_u$ belongs to the first zone Z1 of the image $IC_j$, and if the first syntax element activate_ibc decoded at D1 has the value 1, there is undertaken at D7a) the reading, in the data signal F, of the syntax element ibc_flag, by means of the stream analysis device PARS_D of FIG. 5, and of its decoding, by means of the decoding device MD_D.

According to the invention, if the first syntax element activate_ibc decoded at D1 or else previously has the value 1, there is undertaken at D6a) the reading in the data signal F of the syntax element ibc_flag, by means of the stream analysis device PARS_D of FIG. 5, and of its decoding, by means of the decoding device MD_D.

In accordance with the invention:
- if the syntax element ibc_flag has the value 1, there is implemented at D8a) a determination of the predictor block $BP_{opt}$ serving in the prediction of the "Intra Block Copy" type for the block $B_u$ to be decoded, the location of the predictor block $BP_{opt}$ stored in the second zone of the image $IC_j$ being identified by syntax elements which are decoded in the data signal F: such syntax elements are for example a motion vector which points at the predictor block $BP_{opt}$, the coordinates of the first pixel at the top left of the predictor block $BP_{opt}$, etc . . . ;
- if the syntax element ibc_flag has the value 0, there is implemented at D8a) a determination of the predictor block $BP_{opt}$ serving in the prediction of the current block $B_u$ which is different from the prediction of the "Intra Block Copy" type. It may entail for example an intra or inter conventional prediction on completion of which a predictor block $BP_{opt}$ associated with an indicator previously read in the data signal F is obtained.

With reference to FIG. 4, the coded data $DC_u$ of the current block $B_u$ are decoded at D9a). Such a decoding is implemented by a device for decoding blocks MDB_D which is represented in FIG. 5, which device is driven by the processor PROC_D.

The decoding D9a) implements, at D91a), a decoding of the data $DC_u$ associated with the current block $B_u$ to be decoded and which have been coded at C8a) in FIG. 1. On completion of such a decoding, a set of numerical information is obtained, the latter being associated with the block of quantized coefficients $Bq_u$ which was obtained at C82a) in FIG. 1.

The decoding D91a) is implemented by the decoding device MD_D represented in FIG. 5.

The decoding D9a) furthermore implements a dequantization D92a) of the block of quantized coefficients $Bq_u$, according to a conventional dequantization operation which is the operation inverse to the quantization C82a) of FIG. 1. A current set of dequantized coefficients $BDq_u$ is then obtained. Such a dequantization is for example of scalar or vector type and is implemented by means of an inverse quantization device $MQ^{-1}\_D$, such as represented in FIG. 1, which device is driven by the processor PROC_D.

The decoding D9a) furthermore implements the application D93a) of a transform to the current set of dequantized coefficients $BDq_u$ obtained at D92a). In a manner known per se, such a transform is a transform inverse to that applied to the coding at C81a) in FIG. 1, such as for example a DCT, DST, DWT, LT or other transform. In a corresponding manner to the coder CO of FIG. 2, these transforms form part of a list of transforms $LTS^{-1}$ which is stored previously in the buffer memory MT_D of the decoder DO of FIG. 5. The type of transform to be applied can be determined at the decoder conventionally, by reading, in the data signal F, the index of the transform applied to the coding.

The transform application D93a) is performed by a transform calculation device $MTR^{-1}\_D$, such as represented in FIG. 5, which device is driven by the processor PROC_D.

The inverse quantization device $MQ^{-1}\_D$ and the transform calculation device $MTR^{-1}\_D$ are contained in a device for decoding blocks MDB_D which is represented in FIG. 5, which device is driven by the processor PROC_D.

A current decoded residual block $BDr_u$ is obtained on completion of the decoding D9a) of the data of the current block.

With reference to FIG. 4, at D10a), the current decoded residual block $BDr_u$ is added to the predictor block $BP_{OPT}$ located at D6a).

The operation D10a) is implemented by a predictive decoding device PRED_D represented in FIG. 5, which device is driven by the processor PROC_D.

With reference to FIG. 4, there is undertaken at D11a) the writing of the current decoded block $BD_u$ in a decoded image $ID_j$.

The writing D11a) is implemented by an image reconstruction device URI such as represented in FIG. 5, the device URI being driven by the processor PROC_D.

On completion of the location D6 of FIG. 4, if the current block $B_u$ to be decoded belongs to the second zone Z2 of the image $IC_j$, there is undertaken at D7b):
- the reading in the data signal F, by means of the stream analysis device PARS_D of FIG. 5, of information relating to the conventional prediction C6b) implemented on coding,
- and of the decoding of this information, by means of the decoding device MD_D.

With reference to FIG. 4, there is implemented at D8b) a determination of the predictor block $BP_{opt}$ serving in the prediction of the current block $B_u$ which is different from the prediction of the "Intra Block Copy" type. It may entail for example an intra or inter conventional prediction on completion of which is obtained a predictor block $BP_{opt}$ associated with the information which is read at C6b) in the data signal F, and is then decoded.

With reference to FIG. 4, the coded data $DC_u$ of the current block $B_u$ are decoded at D9b) by the device for decoding blocks MDB_D of FIG. 5.

The decoding D9b) comprises operations D91b), D92b) and D93b) which are respectively identical to the aforementioned operations D91a), D92a) and D93a) and, which for this reason, are not described again here.

On completion of the decoding D9b) of the data of the current block, a current decoded residual block $BDr_u$ is obtained.

With reference to FIG. 4, at D10b), the predictive decoding device PRED_D of FIG. 5 adds the current decoded residual block $BDr_u$ to the predictor block $BP_{opt}$ located at D6.

With reference to FIG. 4, there is undertaken at D11b) the writing of the current decoded block $BD_u$ in a decoded image $ID_j$.

In accordance with the invention, if first syntax element activate_ibc has the value 1, with reference to FIG. 4, there is undertaken at D100b) the storage of the current decoded block $BD_u$ in a space ES of the buffer memory MT_D of the decoder DO of FIG. 5 so as to be used by the decoder DO to predict the following blocks of the current image $IC_j$ to be decoded or of another image.

The storage D100b) is implemented either before the operation of writing D11b) the current decoded block in the decoded image $ID_j$, or after.

The decoding method which has just been described hereinabove is implemented for all the coded data of blocks $DC_1, DC_2, \ldots, DC_u, \ldots, DC_S$ wherein said data are associated respectively with the blocks $B_1, B_2, \ldots, B_S$ to be decoded of the current image $IC_j$ considered and in a differentiated manner depending on whether the coded data are associated with a block situated in the first zone or the second zone of the current image $IC_j$ to be decoded.

It goes without saying that the embodiments which have been described hereinabove have been given purely by way of wholly non-limiting indication, and that numerous modifications can easily be made by the person skilled in the art without however departing from the scope of the invention.

What is claimed is:

1. A coding method comprising:
coding a current image split up into blocks, said current image containing at least two distinct first and second zones of blocks which do not overlap and are defined previously to the coding of any block of said current image, wherein a block of the first zone is located to the left of a block of the second zone, and wherein said coding comprises the following acts performed by a coding device:
coding the block of said first zone, by:
predicting the block of said first zone by using the block of the second zone that has been previously coded and then decoded, and
coding an item of information which indicates if a mode of prediction Intra Block Copy has been used or not to predict the block of said first zone;
decoding the coded block of the first zone; and
storing data of the decoded block of the first zone as a function of the item of information that has been coded.

2. The coding method as claimed in claim 1, comprising coding at least one item of location information in respect of the previously coded and then decoded block.

3. The coding method as claimed in claim 1, implementing coding an item of identification information in respect of each of the at least two zones of the current image.

4. A coding device comprising:
a processing circuit which is designed to code a current image split up into blocks, said current image containing at least two distinct first and second zones of blocks which do not overlap and are defined previously to the coding of any block of said current image, wherein a block of the first zone is located to the left of a block of the second zone, wherein the processing circuit codes the current image by:
coding the block of said first zone, by:
predicting the block of said first zone by using the block of the second zone that has been previously coded and then decoded, and
coding an item of information which indicates if a mode of prediction Intra Block Copy has been used or not to predict the block of said first zone;
decoding the coded block of the first zone; and
storing data of the decoded block of the first zone as a function of the item of information that has been coded.

5. A non-transitory computer-readable recording medium on which is recorded a computer program comprising program code instructions which when executed by a processor of a coding device configure the coding device to:
code a current image split up into blocks, said current image containing at least two distinct first and second zones of blocks which do not overlap and are defined previously to the coding of any block of said current image, wherein a block of the first zone is located to the left of a block of the second zone, wherein the coding comprises:
code the block of said first zone, by:
predicting the block of said first zone by using the block of the second zone that has been previously coded and then decoded, and
coding an item of information which indicates if a mode of prediction Intra Block Copy has been used or not to predict the block of said first zone;
decode the coded block of the first zone; and
store data of the decoded block of the first zone as a function of the item of information that has been coded.

6. A method comprising:
decoding a data signal representative of a current image split up into blocks which has been coded, said at least one current image containing at least two distinct first and second zones of blocks which do not overlap and are defined previously to the decoding of any coded block of said data signal, wherein a block of the first zone is located to the left of a block of the second zone, said decoding comprising the following acts performed by a decoding device:
decoding the block of said first zone, by:
reading in the data signal an item of information which indicates if a mode of prediction Intra Block Copy is to be used or not to predict the block of the first zone, the block of the first zone being intended to be predicted by using the block of the second zone that has been previously decoded, and
decoding the block of the first zone by using a prediction indicated by said read item of information; and
storing data of the decoded block of the first zone as a function of the item of information that has been read.

7. The decoding method as claimed in claim 6, comprising reading, in the data signal, of at least one item of location information in respect of the previously coded and then decoded block.

8. The decoding method as claimed in claim 6, in which each of the zones of the current image is identified by reading a corresponding item of identification information read in the data signal.

9. A decoding device comprising:
a processing circuit which is designed to decode a data signal representative of a current image split up into blocks which has been coded, said current image containing at least two distinct first and second zones of blocks which do not overlap and are defined previously to the decoding of any block of said data signal, wherein a block of the first zone is located to the left of a block of the second zone, wherein the processing circuit decodes the data signal by:
decoding the block of said first zone, by:
reading in the data signal an item of information which indicates if a mode of prediction Intra Block Copy is to be used or not to predict the block of the first zone, the block of the first zone being intended to be predicted by using the block of the second zone that has been previously decoded, and
decoding the block of the first zone by using a prediction indicated by said read item of information; and
storing data of the decoded block of the first zone as a function of the item of information that has been read.

10. A non-transitory computer-readable recording medium on which is recorded a computer program comprising program code instructions which when executed by a processor of a decoding device configure the decoding device to:
decode a data signal representative of a current image split up into blocks which has been coded, said current image containing at least two distinct first and second zones of blocks which do not overlap and are defined previously to the decoding of any block of the data signal, wherein a block of the first zone is located to the left of a block of the second zone, wherein the decoding comprises:

decode the block of said first zone, by:
    reading in the data signal an item of information which indicates if a mode of prediction Intra Block Copy is to be used or not to predict to predict the block of the first zone, the block of the first zone being intended to be predicted by using the block of the second zone that has been previously decoded, and
    decoding the block of the first zone by using a prediction indicated by said read item of information; and store data of the decoded block of the first zone as a function of the item of information that has been read.

\* \* \* \* \*